United States Patent
Baranov et al.

(10) Patent No.: US 9,418,176 B2
(45) Date of Patent: *Aug. 16, 2016

(54) GRAPH-BASED SYSTEM AND METHOD OF INFORMATION STORAGE AND RETRIEVAL

(71) Applicant: LinkedIn Corporation, Mountain View, CA (US)

(72) Inventors: Denis Baranov, San Jose, CA (US); Walter Ronald Fender, San Jose, CA (US); Armen Nofer Hamstra, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,107

(22) Filed: Oct. 9, 2015

(65) Prior Publication Data

US 2016/0034598 A1 Feb. 4, 2016

Related U.S. Application Data

(63) Continuation of application No. 14/590,845, filed on Jan. 6, 2015, now Pat. No. 9,195,709, which is a continuation of application No. 14/146,623, filed on Jan. 2, 2014, now Pat. No. 8,954,441.

(51) Int. Cl.
*G06F 17/30* (2006.01)

(52) U.S. Cl.
CPC .... *G06F 17/30958* (2013.01); *G06F 17/30327* (2013.01); *G06F 17/30424* (2013.01); *G06F 17/30864* (2013.01); *G06F 17/30557* (2013.01); *G06F 17/30979* (2013.01)

(58) Field of Classification Search
CPC ............... G06F 17/30554; G06F 17/30699; G06F 17/30958; G06F 17/30979; G06F 17/30864; G06F 17/30327; G06F 17/30424; G06F 17/30557
USPC ................ 707/728, 739, 743, 755, 798, 794
See application file for complete search history.

(56) References Cited

U.S. PATENT DOCUMENTS 6,609,123 B1 8/2003 Cazemier et al.
6,611,838 B1 8/2003 Ignat (Continued)

OTHER PUBLICATIONS

"U.S. Appl. No. 14/146,623, Non Final Office Action mailed Mar. 12, 2014", 11 pgs.

(Continued)

*Primary Examiner* — Jean M Corrielus
(74) *Attorney, Agent, or Firm* — Schwegman Lundberg & Woessner, P.A.

(57) ABSTRACT

Structure of a resultant Every Document as a Graph (EVG) graph may be outlined using an EVG query. First metadata for a first data source may be retrieved. At least one entity key may be determined for a first entity, the entity key coming directly from the EVG query or from an entity on a preceding level of the EVG graph. Based on the first metadata and entity key, an edge may be created in the EVG graph beginning at the first entity, wherein the edge contains information retrieved from the first data source. Second metadata for a second data source may be retrieved. Based on the second metadata and information contained in the edge retrieved from first data source, a second entity may be created in the EVG graph, wherein the edge connects to the second entity, wherein the second entity contains information retrieved from the second data source.

20 Claims, 10 Drawing Sheets

(56) References Cited

U.S. PATENT DOCUMENTS

| | | | |
|---|---|---|---|
| 6,662,188 B1 | 12/2003 | Rasmussen et al. | |
| 7,461,052 B2 | 12/2008 | Dettinger et al. | |
| 7,512,612 B1* | 3/2009 | Akella | G06F 17/30958 |
| 7,539,697 B1* | 5/2009 | Akella | G06F 17/30958 |
| 7,720,789 B2 | 5/2010 | Seeds et al. | |
| 7,769,769 B2 | 8/2010 | Rasmussen | |
| 8,438,364 B2* | 5/2013 | Venkataramani | G06F 17/3048 711/216 |
| 8,527,497 B2* | 9/2013 | Singh | G06F 17/30867 707/707 |
| 8,612,688 B2* | 12/2013 | Venkataramani | G06F 17/3048 711/124 |
| 8,732,208 B2* | 5/2014 | Lee | G06F 17/3053 707/798 |
| 8,751,521 B2* | 6/2014 | Lee | G06F 17/30958 705/319 |
| 8,782,080 B2* | 7/2014 | Lee | G06F 17/30979 707/771 |
| 8,832,111 B2* | 9/2014 | Venkataramani | G06F 17/3048 707/741 |
| 8,938,475 B2 | 1/2015 | Vaitheeswaran et al. | |
| 8,954,441 B1 | 2/2015 | Baranov et al. | |
| 8,977,611 B2* | 3/2015 | Tseng | G06F 17/30722 705/319 |
| 9,195,709 B2 | 11/2015 | Baranov et al. | |
| 2004/0216086 A1 | 10/2004 | Bau | |
| 2007/0169036 A1 | 7/2007 | Garner et al. | |
| 2007/0294100 A1 | 12/2007 | Chen et al. | |
| 2007/0294312 A1 | 12/2007 | Seshadri et al. | |
| 2008/0270397 A1 | 10/2008 | Buck et al. | |
| 2008/0270470 A1 | 10/2008 | Buck et al. | |
| 2009/0006148 A1* | 1/2009 | Bacalski | G06Q 30/02 705/7.11 |
| 2010/0082646 A1 | 4/2010 | Meek et al. | |
| 2011/0072052 A1 | 3/2011 | Skarin et al. | |
| 2011/0302168 A1 | 12/2011 | Aggarwal | |
| 2012/0173820 A1* | 7/2012 | Venkataramani | G06F 17/3048 711/124 |
| 2012/0215785 A1* | 8/2012 | Singh | G06F 17/30867 707/741 |
| 2012/0324347 A1 | 12/2012 | Monroe et al. | |
| 2013/0110828 A1 | 5/2013 | Meyerzon et al. | |
| 2013/0124538 A1* | 5/2013 | Lee | G06F 17/3053 707/749 |
| 2013/0191372 A1* | 7/2013 | Lee | G06F 17/30958 707/722 |
| 2013/0191416 A1* | 7/2013 | Lee | G06F 17/30979 707/771 |
| 2014/0006412 A1* | 1/2014 | Singh | G06F 17/30867 707/741 |
| 2014/0025702 A1* | 1/2014 | Curtiss | G06Q 50/01 707/769 |
| 2014/0280108 A1* | 9/2014 | Dunn | G06F 17/30699 707/728 |
| 2014/0337373 A1* | 11/2014 | Morsi | G06F 17/30424 707/769 |
| 2015/0186459 A1 | 7/2015 | Baranov et al. | |

OTHER PUBLICATIONS

"U.S. Appl. No. 14/146,623, Notice Allowance mailed Jul. 17, 2014", 9 pgs.

"U.S. Appl. No. 14/146,623, Notice of Allowance mailed Oct. 1, 2014", 9 pgs.

"U.S. Appl. No. 14/146,623, Response filed Jun. 12, 2014 to Non Final Office Action mailed Mar. 12, 2014", 9 pgs.

"U.S. Appl. No. 14/590,845, 312 Amendment filed Oct. 8, 2015", 7 pgs.

"U.S. Appl. No. 14/590,845, Corrected Notice of Allowability mailed Jul. 30, 2015", 4 pgs.

"U.S. Appl. No. 14/590,845, Non Final Office Action mailed Feb. 23, 2015", 16 pgs.

"U.S. Appl. No. 14/590,845, Notice of Allowance mailed Jul. 8, 2015", 9 pgs.

"U.S. Appl. No. 14/590,845, Preliminary Amendment filed Jan. 6, 2015", 3 pgs.

"U.S. Appl. No. 14/590,845, PTO Response to Rule 312 Communication mailed Oct. 28, 2015", 2 pgs.

"U.S. Appl. No. 14/590,845, Response filed May 19, 2015 to Non Final Office Action mailed Feb. 23, 2015", 15 pgs.

"GitHub", [Online], Retrieved from the Internet: <URL: https://github.com/linkedin/parseq>, (Accessed Oct. 29, 2013), 2 pgs.

"Graphviz—Graph Visualization Software", [Online]. Retrieved from the Internet: <URL: http://www.graphviz.orgl>, (Accessed Oct. 29, 2013), 5 pgs.

"International Application Serial No. PCT/US2014/032406, International Search Report mailed Sep. 8, 2014", 2 pgs.

"International Application Serial No. PCT/US2014/032406, Written Opinion mailed Sep. 8, 2014", 5 pgs.

"Neo4j—The World's Leading Graph Database—Learn Cypher—The Neo4j query language", [Online]. Retrieved from the Internet: <URL: http:6/www.neo4j.org/learn/cypher>, (Accessed Oct. 30, 2013), 1 pg.

Berners-Lee, T., "Uniform Resource Identifier", Copyright (C) The Internet Society, [Online], Retrieved from the Internet: <URL: http://tools.ietf.org/html/rfc3986>, (Jan. 2005), 57 pgs.

Parr, Terence, "ANTLR", © Copyright ANTLR / Terence Parr 2012, [Online]. Retrieved from the Internet: <URL: http://antlr.org/>, (Accessed Oct. 29, 2013), 3 pgs.

\* cited by examiner

GRAPH-BASED SYSTEM AND METHOD OF INFORMATION STORAGE AND RETRIEVAL

CROSS-REFERENCE TO RELATED APPLICATIONS

This application is a continuation of U.S. patent application Ser. No. 14/590,845, filed Jan. 6, 2015, which is a continuation of U.S. patent application Ser. No. 14/146,623, filed Jan. 2, 2014, now U.S. Pat. No. 8,954,441, issued Feb. 10, 2015.

TECHNICAL FIELD

This application relates to the technical fields of software and/or hardware technology and, in one example embodiment, to a graph-based system and method of information storage and retrieval.

BACKGROUND

Storing large numbers of documents in an efficient and quick-to-retrieve manner is a common problem with databases. A number of different solutions have been provided in the database arena, where data is stored in a single database in a single domain. However, recently web sites such as social networks have attempted to gather and access documents from different domains and combine them to satisfy a particular business case. A number of problems have been encountered in such situations, including having to deal with redundant data stores for relationships, duplication of operation and maintenance effort, and significant scalability issues that need to be addressed frequently.

BRIEF DESCRIPTION OF DRAWINGS

Embodiments are illustrated by way of example and not limitation in the figures of the accompanying drawings, in which like reference numbers indicate similar elements and in which.

Figure 1:
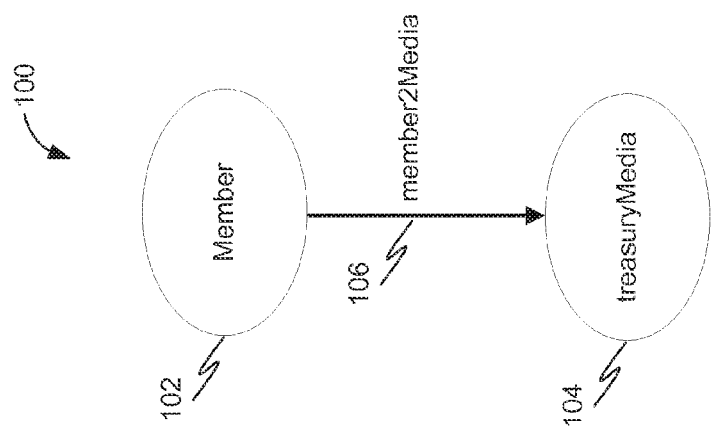
FIG. 1 is a graph for a document in accordance with an example embodiment.

DETAILED DESCRIPTION in an example embodiment, a uniform, generic system for user case-specific relationships is provided. A graph-based model may be provided to allow for simpler and consistent mental models. Users are able to define domain models and perform queries in an efficient and easy-to-understand manner. Furthermore, the system simplifies scaling and operations by leveraging a small number of relatively generic systems and an open multi-tenant architecture for features of appropriate scale. Data sources are abstracted, and the system is able to store and retrieve metadata about the data sources and is able to efficiently use this metadata to gather desired data from the data sources. In this way, a service provider such as a social networking website may accelerate time-to-market of new features and services and reduce cost by enabling reuse and abstraction of existing data objects, which has the effect of reducing duplicate effort.

As used herein, the term "or" may be construed in either an inclusive or exclusive sense. Similarly, the term "exemplary" merely means an example of something or an exemplar and not necessarily a preferred or ideal means of accomplishing a goal. For the purposes of this description, the phrase "an on-line social networking application" may be referred to as and used interchangeably with the phrase "an on-line social network" or merely "a social network." It will also be noted that an on-line social network may be any type of an on-line social network such as, for example, a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources such as, for example, publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Reputation scores may be computed based on information obtained from trusted sources, such as patent databases, publications databases, skills, endorsement of skills, or even enterprise contracts.

In addition to member profiles, there may be a number of different types of data stored by the social network site. Additionally, data from other data sources, such as audio and video content, email and business documents, calendars, text messages, etc. may also be accessed by the social network site. It would be helpful if all this data can be accessed in an efficient manner and that whatever features the social network site is attempting to set up to access new data types or new data sources can be set up in an efficient manner.

In an example embodiment, a concept known as Every Document as a graph (EVG) is introduced. EVG is a shared, multi-tenant service for supporting entity persistence and discovery, managing relationships, and integrating social gestures. It is a layer on top of data store implementations such as Espresso, Voldemort, Oracle, etc. and acts as a proxy to these data stores.

In an example embodiment, EVG also acts to assemble complex documents and display them as a simple query, offer strongly-typed representations of data to use case-specific clients, and use metadata to function when new types of edges and entities are introduced, without having to rebuild, redeploy, or disrupt existing clients.

In an example embodiment, EVG breaks down rich domain objects that are often represented as hierarchical documents into a graph where individual entities are tied together via directional associations or edges. In EVG, every relationship is represented as an edge and every rich object or document is a graph.

FIG. 1 is a graph 100 for a document in accordance with an example embodiment. Here, a member node 102 is linked to a treasuryMedia node 104 via an edge 106, representing the relationship between the member node 102 and the treasuryMedia node 104. To get to a member's media content stored in a treasuryMedia entity, the member2Media edge 106 may be used.

The generic framework of EVG makes it easy for the user to assemble a graph from distinct data stores. In an example embodiment, from a database perspective, EVG follows a normalized approach where entities and edges are stored in separate tables, making it easy to recombine these elements to satisfy different use cases. In an example embodiment, EVG is metadata-driven to distinguish stored edges from entities. The metadata also may map entities to physical data stores. EVG can then handle the assembly of these data objects based on an intuitive query language expression.

For purposes of this disclosure, a document may be considered to be a rich data object combining elements of different domains. An element may be considered a generic term for a data envelope, and can either be an entity or an edge. An entity or vertex may be considered a material part of a domain model carrying attributes. An association or relationship may be considered to be a direct connection between two entities. An edge may be considered to be a meaning attached to an association. A gesture may be considered a sum of social interactions with entities (e.g., comments, likes, feeds, etc.). A feed may be considered to be an activity stream for a given number of entities.

Figure 2:
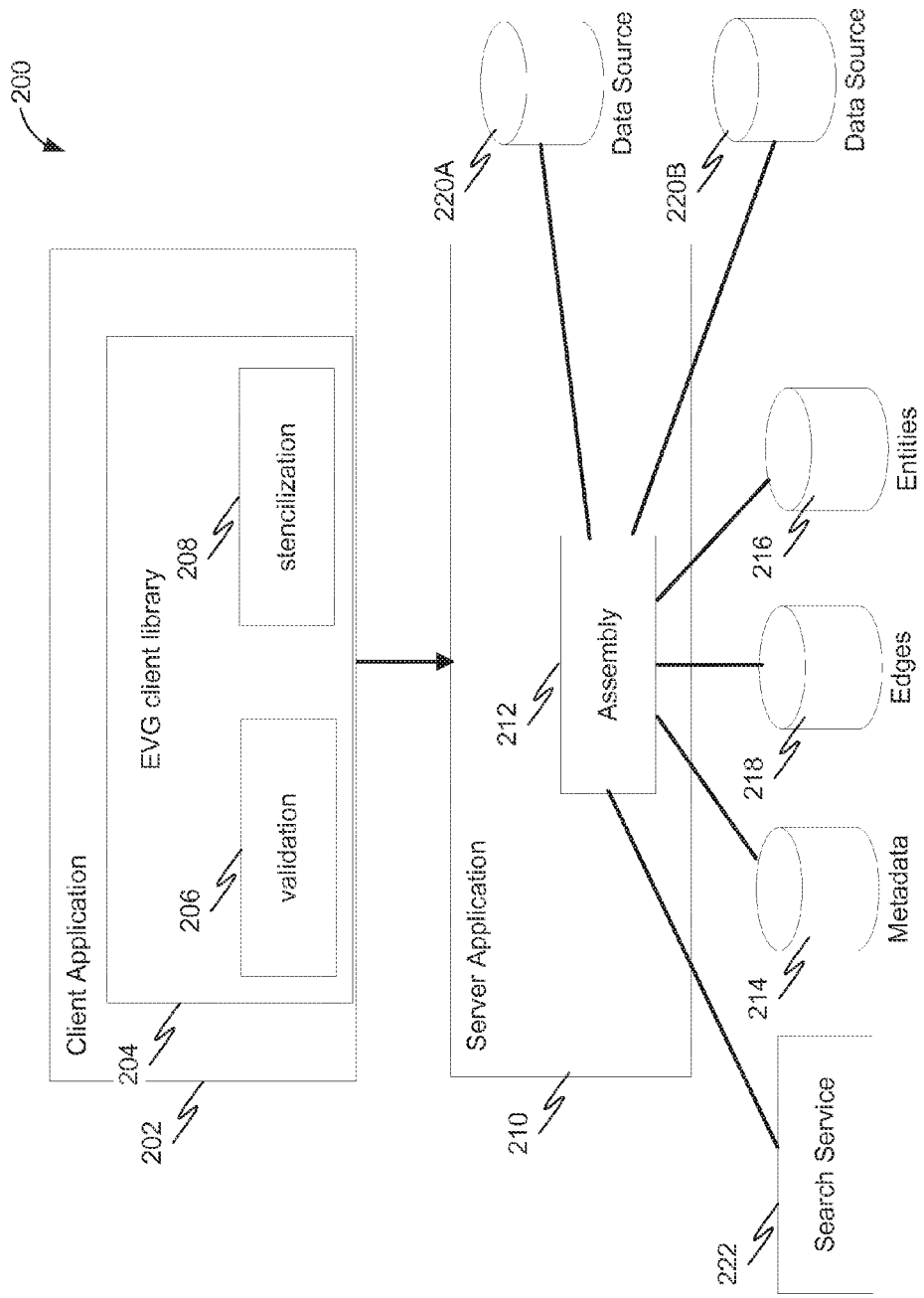
FIG. 2 is a block diagram illustrating a system of implementing Every Document as a graph (EVG) in accordance with an example embodiment.

FIG. 2 is a block diagram illustrating a system 200 of implementing EVG in accordance with an example embodiment. A client application 202 may contain an EVG client library 204, which may perform validation 206 and stencilization 208 activities. A server application 210 may perform assembly 212 of each EVG graph. A metadata store 214 may store and serve mappings, queries, association constraints, registries of virtual associations, and other metadata related to the graphs. An entity store 216 may store and serve entity data. The metadata store 214 may be partitioned by entity. An edge store 218 may store associative links/edges. In an example embodiment, all edges are stored in the same partition/database/table, with distinction between adjacency list and "row-per-edge" storage format.

The assembly 212 may construct the graphs by accessing one or more external data stores 220A, 220B, and storing the corresponding graph information in the metadata store 214, entity store 216, and edge store 218. A search service 222 may be used to find relationships spanning several degrees of separation, and traverse bidirectional relationships. The search service 222 may also extend an EVG query to support the indexing of metadata.

In an example embodiment, at least one of the external data sources 220A, 220B is a key-value store system, such as Espresso. Key-value store systems lose the ability to perform traditional JOIN operations common to relational databases. In light of this, the system may be designed with query parameters and features designed to maintain edges in a manner that helps make up for the loss of such traditional JOIN operations.

Figure 3:
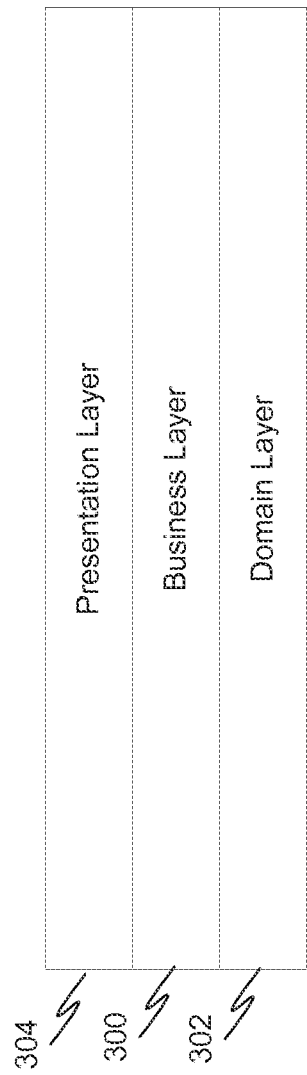
FIG. 3 is a block diagram illustrating various layers of a server application in accordance with an example embodiment.

FIG. 3 is a block diagram illustrating various layers of a server application 210 in accordance with an example embodiment. A business layer 300 may allow assembly of data per the client's specification via EVG graphs, and may manage mapping of entity types to uniform resource names (URN) and uniform resource identifiers (URI). A domain layer 302 may define and publish schemas, formulate queries and invocations, take on the responsibility of reconstituting foreign domain objects, and use visibility constraints to filter obscure pieces of data that are restricted based on domain logic, such as privacy settings, subscription status, etc. In an example embodiment, the domain layer 302 may be implemented using a domain-specific REST.LI service. REST.LI is a Java framework that allows users to create clients and servers using a Representational State Transfer (REST) style.

The domain layer 302 may also, via the EVG client library 204, perform validations driven by schemas and provide strongly typed interfaces proxying data maps (stencils).

A presentation layer 304 may then emit flattened, simplified Javascript Object Notation (JSON) for consumption by clients, and take user input to be persisted and send it to the business layer 300 to be stored in an EVG graph.

In an example embodiment, data sources are abstracted to provide a single interface for multiple data sources. The EVG graphs stich together heterogeneous data and a query engine is then able to access multiple data stores in parallel. By partitioning data, the EVG graphs also become extremely scalable. Related entities may be clustered and parallel queries may be executed for additional scalability.

Data structures used by the EVG graphs in one example embodiment are described herein. One of ordinary skill in the art will recognize that these are merely examples, and that other data structures may be utilized in some embodiments.

URNs may be represented as a sequence of variables including scheme, entity type, partition key, and entity key. For example, the URN "urn:li:media:(urn:li:member:123, 456)" may indicate a scheme of "urn:li", an entity type of "media", a partition key of "member:123" and an entity key of "456".

Entities may be represented as strongly-typed Java objects having sub-entities and lists. They may contain properties such as URN and type.

Edges may be represented as strongly-typed Java objects having various properties, such as URNS, from entity URNs, to entity URNs, edge types, and various attributes.

Adjacency lists may contain properties such as from entity URN, edge type, and an ordered list of edges.

In an example embodiment, associations can be modeled in two ways: sub-entities and entities+edges. Composition ("part of") relations, such as where the member has a list of positions he has worked at, may be modeled as sub-entities, while non-composition relations, such as which companies the member has worked for, may be modeled as entities+edges.

The following is example code illustrating setting up an ECG client in accordance with an example embodiment.

```
// Initialize client
EVGClient client = __generator.getBean(EvgClientFactory.class);
// Setup data
Author author = new Author( );
author.setName("Mark Twain");
Book book = new Book( );
```

```
book.setAuthor(author);
// Store
Urn urnPat = new Urn("urn:li:book:(urn:li:member:123,?)");
CreateEntityRequest createRequest =
     CreateEntityRequest.builder( ).setUrn(urnPat).setEntity(book).build(
     );
CreateEntityResponse createResponse = client.execute(createRequest);
Urn urn = createResponse.getUrn( );
// Retrieve
GetEntityRequest getRequest = GetEntityRequest.builder(
).setUrn(urn).build( );
GetEntityResponse getResponse = client.execute(getRequest);
Book outBook = getResponse.getEntity(Book.class);
System.out.println("Author is " + outBook.getAuthor.getName( ));!!
```

Figure 4:
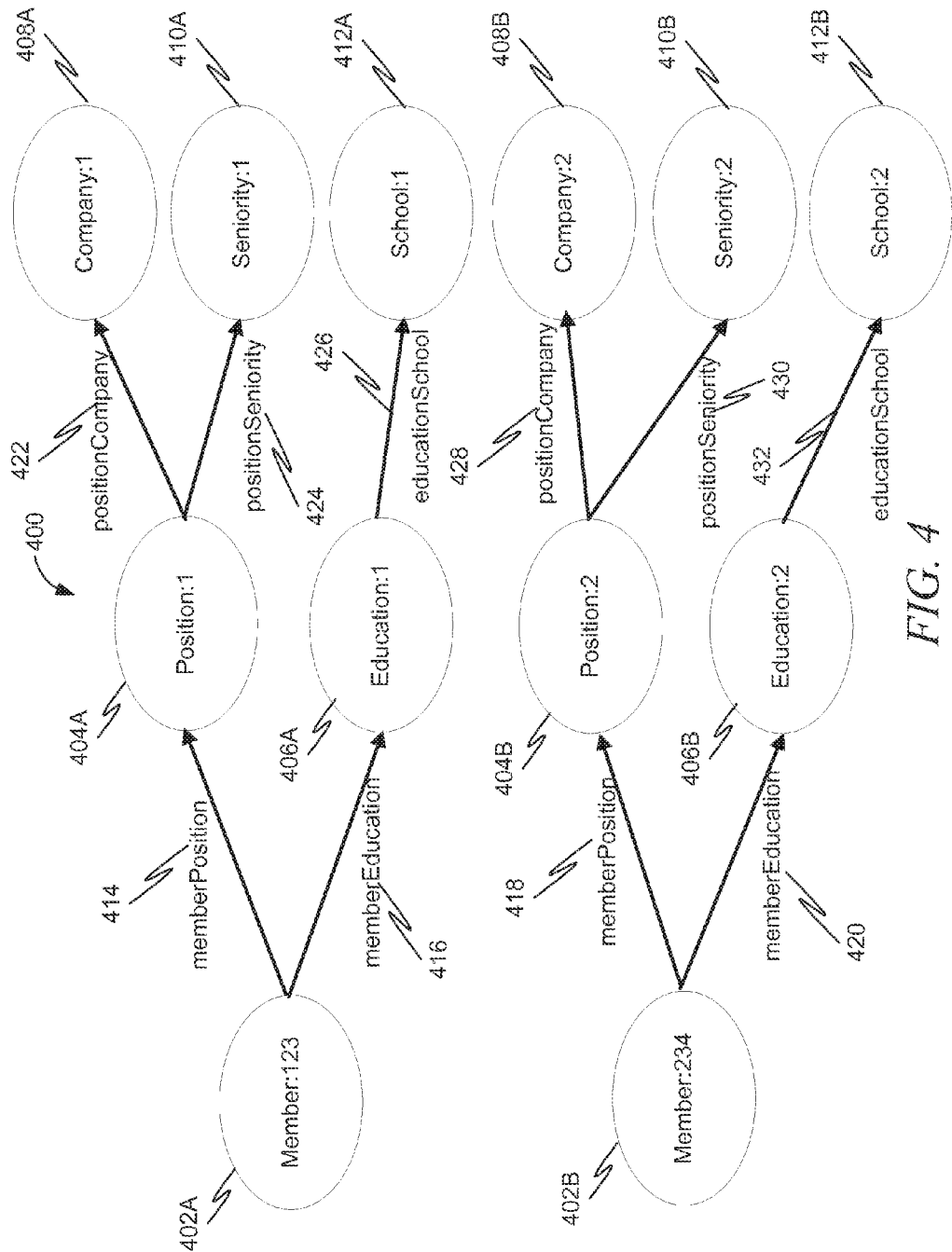
FIG. 4 is a block diagram illustrating an EVG graph in accordance with an example embodiment.

FIG. 4 is a block diagram illustrating an EVG graph 400 in accordance with an example embodiment. The EVG graph 400 contains two member nodes 402A, 402B. Member node 402A corresponds to member "123" while member node 402B corresponds to member "234". These nodes are each linked to a position node 404A, 404B and an education node 406A, 406B. Each position node 404A, 404B is linked to a company node 408A, 408B and a seniority node 410A, 410B. Each education node 406A, 406B is linked to a school node 412A, 412B. The edges 414, 416, 418, 420, 422, 424, 426, 428, 430, and 432 are all named so that they can easily identify to a user what sort of information is stored on the node following the edge. This allows the user to easily specify a query using a query language. For example, the user may write the following in the query language:

```
from {'urn:member:123', 'urn:member:234'} get entity
     {over memberPosition get entity
          {over positionCompany get entity;
          over positionSeniority get entity;}
          over memberEducation get entity over educationSchool get entity;}
``` which indicates to the system that the user wishes to get all the company nodes 408A, 408B, seniority nodes 410A, 410B, and school nodes 412A, 412B.

Figure 5:
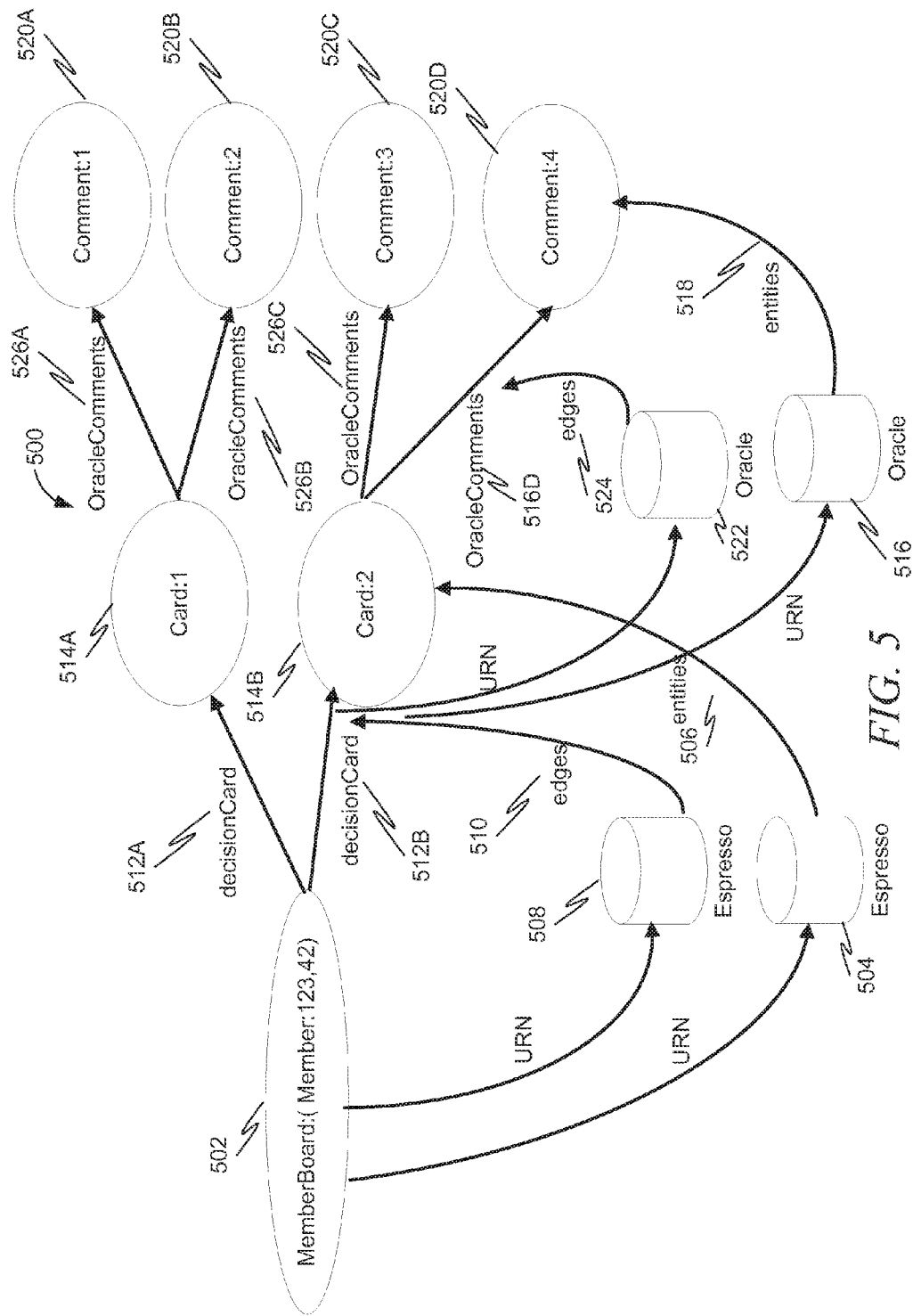
FIG. 5 is a block diagram illustrating an EVG graph in accordance with another example embodiment.

FIG. 5 is a block diagram illustrating an EVG graph 500 in accordance with another example embodiment. Here, rather than a working history use case such as in FIG. 4, the EVG graph 500 represents admission decisions in higher education (e.g., college admissions). A memberboard node 502 may identify a member of an admissions board of the university, and member data may be stored in a first data store 504 having a first data store type, such as Espresso. The URN for the memberboard node 502 may point to the first data store 504, where entity data 506 is stored. Another URN may point to another data store 508, where edge data 510 is stored. This additional data store 508 is depicted as another Espresso database, and in some embodiments may be the same data store as the first data store 504. In other embodiments, this additional data store 508 may be a completely different type than the first data store 504.

Here, the edge data 510 indicates two edges 512A, 512B, each to a decision card node 514A, 514B defined by entity data 506. Each decision card node 514A, 514B then contains a URN pointing to a second data store 516 having a second data store type, such as Oracle. The second data store 516 then contains entity data 518 indicating comment nodes 520A, 502B, 520C, 520D. Another URN may point to another data store 522, where edge data 524 is stored. This additional data store 508 is depicted as another Oracle database, and in some embodiments may be the same data store as the second data store 516. In other embodiments, this additional data store 522 may be a completely different type than the second data store 516.

Here, edge data 524 indicating edges 526A, 526B, 526C, 526D, which are edges to comment nodes 520A, 520B, 520C, 520D.

If a user wishes to perform a query, such as "get all decision cards from a member board and get all the comments on the decision cards," the user can create a query language query as follows:

```
from {'urn:memberBoard:(urn:li:member:123,42)'} get urn
     { over decisionCard get entity
          over uscpComments get entity; }
```

In an example embodiment, a Java-based client may be provided for programmatic access to the EVG graphs. The client utilizes a common builder pattern for constructing requests and responses. It may provide a layer of abstraction above the REST layer and may be capable of producing and consuming objects typed to client-specific domain classes.

The client may be used to construct basic requests and responses. The following is sample code for creating an entity in accordance with an example embodiment:

```
SampleAuthor author = new SampleAuthor( );
Urn urnTemplate = new Urn("urn:li:author:(memberx:123,?)");
CreateEntityRequest request =
CreateEntityRequest.builder(
).setUrn(urnTemplate).setEntity(author).build( );
CreateEntityResponse response = __client.execute(request);
```

The following is sample code for retrieving an entity in accordance with an example embodiment:

```
GetEntityRequest request = GetEntityRequest.builder( ).setUrn(new
Urn("urn:li:memberx:234")).build( );
GetEntityResponse response = __client.execute(request);
RecordTemplate entity = response.getEntity( );
```

The following is sample code for updating an entity in accordance with an example embodiment:

```
SampleMedia media = new SampleMedia( );
UpdateEntityRequest request = UpdateEntityRequest.builder(
).setUrn(new
Urn("urn:li:media:(memberx:123,42)")).setEntity(media).build( );
UpdateEntityResponse response = __client.execute(request);
```

The following is sample code tier deleting an entity in accordance with an example embodiment:

```
DeleteEntityRequest request =
DeleteEntityRequest.builder( ).setUrn(__mediaUrn1).build( );
DeleteEntityResponse response = __client.execute(request);
```

The following is sample code for adding an edge in accordance with an example embodiment:

```
CreateEdgeRequest request =
CreateEdgeRequest.builder(
).setFromUrn(__memberUrn1).setEdgeType(__memberM
ediaEdgeType
```

```
    ).setToUrn(__mediaUrn1).build( );
    CreateEdgeResponse response = __client.execute(request);
```

The following is sample code for deleting an edge in accordance with an example embodiment:

```
DeleteEdgeRequest request =
DeleteEdgeRequest.builder(
    ).setFromUrn(__memberUrn1).setEdgeType(__memberM
    ediaEdgeType
    ).setToUrn(__mediaUrn1).build( );
DeleteEdgeResponse response = __client.execute(request);
```

The following is sample code for querying in accordance with an example embodiment:

```
final String query = "from {'urn:li:memberx:123', 'urn:li:memberx:234'} " +
"get entity {over memberPosition get entity; over
memberEducation get entity;}";
QueryRequest request = QueryRequest.builder( ).setQuery(__query).build( );
QueryResponse response = __client.execute(request);
DomainGraph graph = response.getDomainGraph( );
```

In an example embodiment, the system may support metadata and index metadata for entities and edges. Metadata may be used to define each entity and edge type for a particular use case, and index metadata may be used to access entity data through a data source's secondary index.

In an example embodiment, a number of different attributes are available for a user to create metadata for a new entity or edge, including entityType, urnResolver, urnResolverConfig, edge, rowPerEdge, edgeMultiTenant, and reducedEdge.

The entityType attribute supports entities and edges and specifies the name of the entity or edge.

The urnResolver attribute specifies the data store.

The urnResolverConfig attribute is a map with attributes specific to the resolver (data store). The map may include database and table information for the entity, and the URN pattern which will specify the URN to database translation.

The edge attribute specifies whether the entity type is an entity or an edge.

The rowPerEdge attribute indicates whether each edge is stored in one separate row or several edges can be aggregated into one row.

The edgeMultiTenant attribute specifies whether multiple edge types can be stored in the table.

The reducedEdge attribute specifies whether the edge can be stored in a reduced format.

Referring back to the example in FIG. 1 having a member entity 102 with an edge 106 to an entity for treasuryMedia 104, various metadata for each of these elements may be provided. For example, the following is sample metadata for the entity treasuryMedia 104 in accordance with an example embodiment:

```
//Metadata if the entity treasuryMedia is stored in Oracle
{
"urnResolver":"oracle",
"entityType":"treasuryMedia",
"urnResolverConfig":
{
"com.linkedin.evg.internal.OracleUrnResolverConfig":
{
"table":"TREASURY__MEDIA",
"dbUri":"jdbc:oracle:thin:evg/evg@//devdb:1521/DB"
}
},
"edge":false
}
//Metadata if the entity treasuryMedia is stored in Espresso
{
"urnResolver":"espresso",
"entityType":"treasuryMedia",
"urnResolverConfig":
{
"com.linkedin.evg.internal.EspressoUrnResolverConfig":
{
"table":"TreasuryMedia",
"database":"evg",
"urnPatternRead":"urn:li:treasuryMedia:(urn:li:member:$0,$1)",
"espressoCluster": "http://esv4-be51.corp.linkedin.com:12921"
}
},
"edge":false
}
```

The following is sample metadata for the edge member2Media 106 in accordance with an example embodiment:

```
//Metadata if the edge member2Media is stored in Oracle
{
"entityType":"member2Media",
"urnResolver":"oracle",
"urnResolverConfig":
{
"com.linkedin.evg.internal.OracleUrnResolverConfig":
"
"dbUri":"jdbc:oracle:thin:evg/evg@//devdb:1521/DB"
"table": "TreasuryAdjacencyList",
"urnPatternRead": "urn:li:member2Media:(urn:li:member:$0,$1)",
"database": "evg"
}
},
"edge":true,
"rowPerEdge": false
}
//Metadata if the edge member2Media is stored in Espresso
{
"entityType":"member2Media",
"urnResolver":"espresso",
"urnResolverConfig":
{
"com.linkedin.evg.internal.EspressoUrnResolverConfig":
{
"espressoCluster": "http://esv4-be51.corp.linkedin.com:12921",
"table": "TreasuryAdjacencyList",
"urnPatternRead": "urn:li:member2Media:(urn:li:member:$0,$1)",
"database": "evg"
}
},
"edge":true,
"rowPerEdge": false
}
```

In an example embodiment, a number of different attributes are available for a user to create index metadata for a new entity or edge, including indexName, urnResolver, urnResolverConfig, edge, toIndexField, indexFields, and supportedEdges.

The indexName attribute specifies the name of the entity or edge.

The urnResolver attribute defines the data store.

The urnResolverConfig attribute is a map with attributes specific to the resolver (data store). The map includes database and table information for the entity and the URN pattern which specifies the URN to database translation.

The edge attribute specifies whether the entity type is an entity or an edge.

The toIndexField attribute is used if the entity is an edge and specifies a full valid URN. The system then retrieves and returns the data defined in this URN.

The supportedEdges attribute specifies the edges in an EVG graph query supported by the index.

In an example embodiment, entities are stored in a table per per-domain object. In an alternative embodiment, a completely opaque binary envelope is used. In the table per per-domain object case, this means that users create a table for their objects. In order to allow the data to be partitioned, all keys, for both entities and edges, begin with a partition key. In an example embodiment, this may be a member identification. Consequently, since the URN needs to carry enough information to fill in the parameters of the request to perform any of the operations on the underlying data store, it also needs to have the identification of the domain specific object along the way.

Table 1 depicts example URNs in accordance with an example embodiment:

TABLE 1

| Entity | URN | Notes |
| --- | --- | --- |
| members's profile | urn:li:member:1 | |
| position #123 | urn:li:position:(urn:li:member:1,123) | Although position is an integral part of a profile, it can also be served up as an entity of its own, while acting as a sub-entity of a member's profile |
| member profile's section | urn:li:profileSection:(urn:li:member:1,RECOMMENDATIONS) | An object with this address does not exist nor is ever materialized outside of a members profile; this effectively refers to an area on the screen where corresponding data is rendered. |
| treasury media #456 | urn:li:treasuryMedia:(urn:li:member:1,456) | |

The results of using an EVG graph is that data from multiple data sources may be abstracted and queries for data from these multiple data sources can be sent to a single destination: the EVG system. The EVG system maintains the edges for the data in these multiple data sources. Each entity itself may be unaware that another entity exists, even if an edge is present between the two entities, because the EVG system maintains the edges separately from the entities.

The EVG system is also able to retrieve all pieces of data in parallel, despite the fact that they may be disparate pieces of data in disparate data sources, as opposed to prior art techniques where the system retrieves at least some data in series, necessitating a waiting period until the final piece of data is retrieved, prior to loading. Additionally, the EVG system is also intelligent enough such that if one of the disparate pieces of data being retrieved has an edge to another piece of data (e.g., a sub-entity), it can immediately retrieve that other piece of data. Thus, for example, if there are two entities, labeled media1 and media2, each having an edge to sub-entities, labeled group1 and group2, the system, upon retrieving media1, can immediately begin retrieving group1, without waiting for media2 to be completely retrieved. Thus, the EVG system is designed to accept queries that specify edges, rather than goal entities, to retrieve. The EVG system then uses these specified edges to return "whatever" entities reside on the other ends of these edges.

Figure 6:
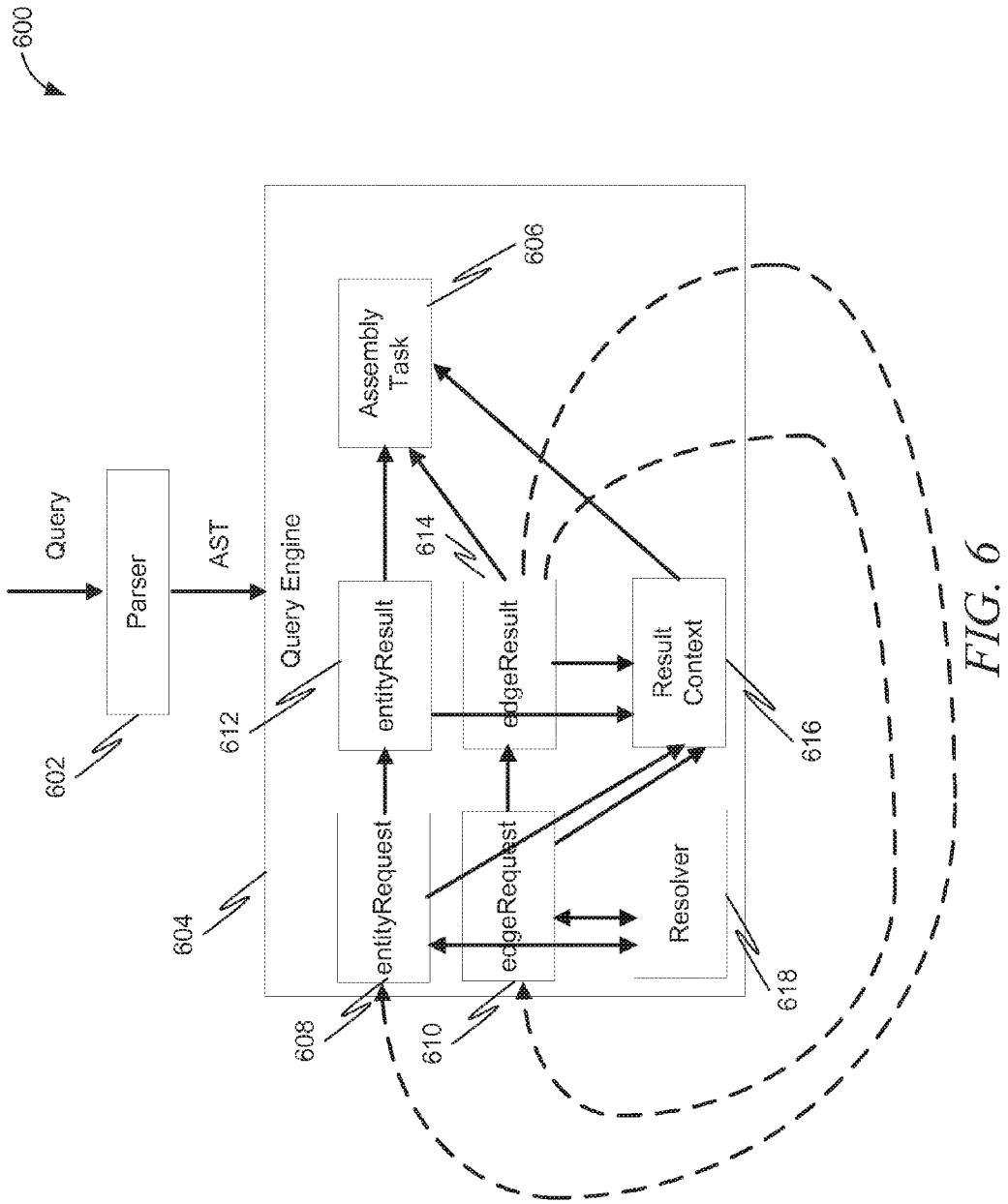
FIG. 6 is a block diagram illustrating an EVG system in accordance with an example embodiment.

FIG. 6 is a block diagram illustrating an EVG system 600 in accordance with an example embodiment. A query (written in a query language) is received at a query parser 602, which generates an abstract syntax tree (AST) representation of the query. This is then passed to a query engine 604. The query engine 604 may then start an assembly task 606, an entity request task 608, an edge request task 610, an entity result task 612, and an edge result task 614. The entity result task 612 may require that the entity request task 608 complete before launching, and the edge result task 614 may require that the entity result task 612 complete before launching. However, the entity result task 612 and the edge result task 614 may each launch additional tasks dynamically as needed. For example, if one of these tasks 612, 614 determine that there is, in fact, an additional group element under the currently retrieved element, it may launch an additional entity request task to retrieve this additional group element. Each request task 608-610 may contain a pointer to where it is located in the AST in order to make this possible.

A result context 616 gathers URNs generated by the tasks 608-610 and retrieves corresponding data from the data sources for these URNs. This helps eliminate duplicate requests. For example, if two different entities are linked to the same media file, the media file, while referenced by two different tasks, will only be retrieved once as the result context 616 is intelligent enough to recognize duplicate URNs and only retrieve one piece of data.

The assembly task 606 then forms the response to the query based on the data from the result context 616.

Notably, the request tasks 608-610 look up in the resolver 618 to determine how to actually retrieve the corresponding data. The resolver 618 provides this information based on the metadata, allowing the request tasks 608 to schedule actual data retrieval calls via URNs. Communication flows 620 and 622 indicate how the edgeResult task 614 can actually cause a loop or cycle by then initiating calls to entityRequest 608 and/or edgeRequest 610.

Figure 7:
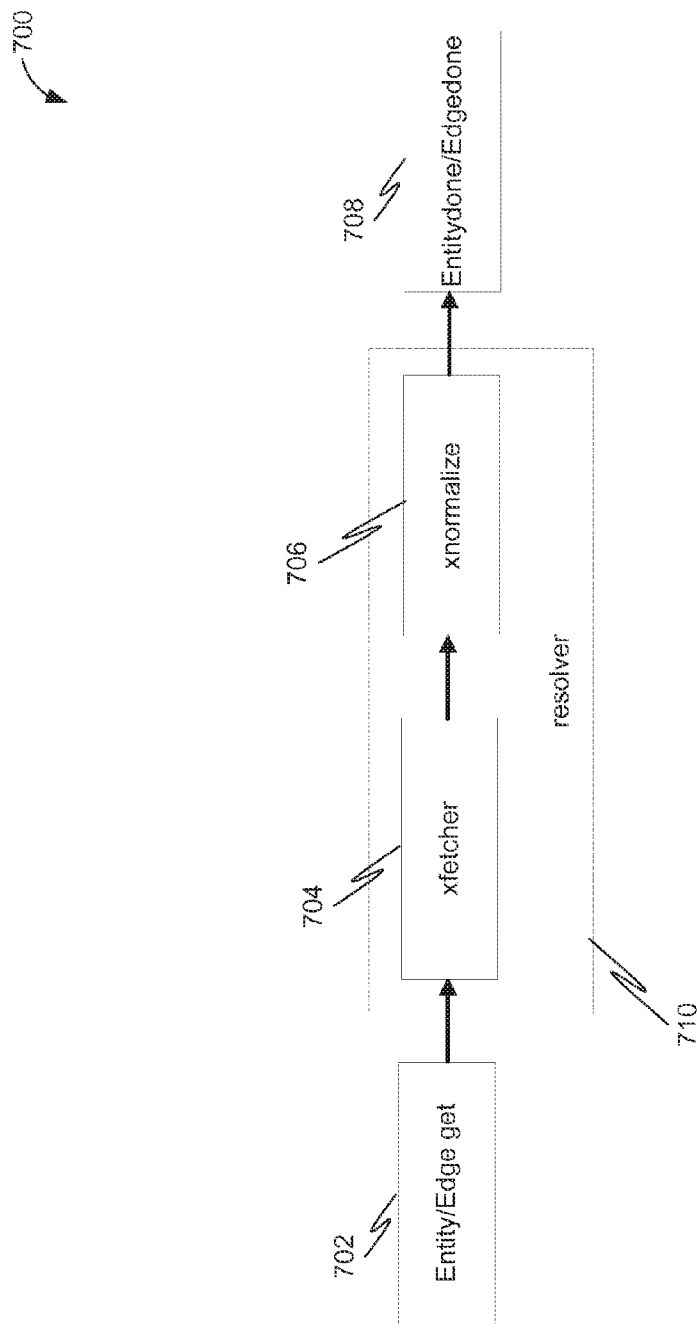
FIG. 7 is a block diagram illustrating a task chain in accordance with an example embodiment.

FIG. 7 is a block diagram illustrating a task chain 700 in accordance with an example embodiment. The task chain 700 includes an entity get 702, which then uses an xfetcher task 704 which, when the result comes back, gets turned into xnormialize 706, which then results entitydone 708. The xfetcher task 704 and the xnomalize 706 task may be collectively known as a resolver 710, which may be plug-and-play, meaning that the resolver 710 for one type of data source can be switched out with the resolver 710. The task chain 700 may be defined by metadata. Additionally, the resolver 710 can be designed as a dual fetcher, performing similar tasks on different data sources simultaneously, which makes it easier for users to migrate data from one data source to another.

Figure 8:
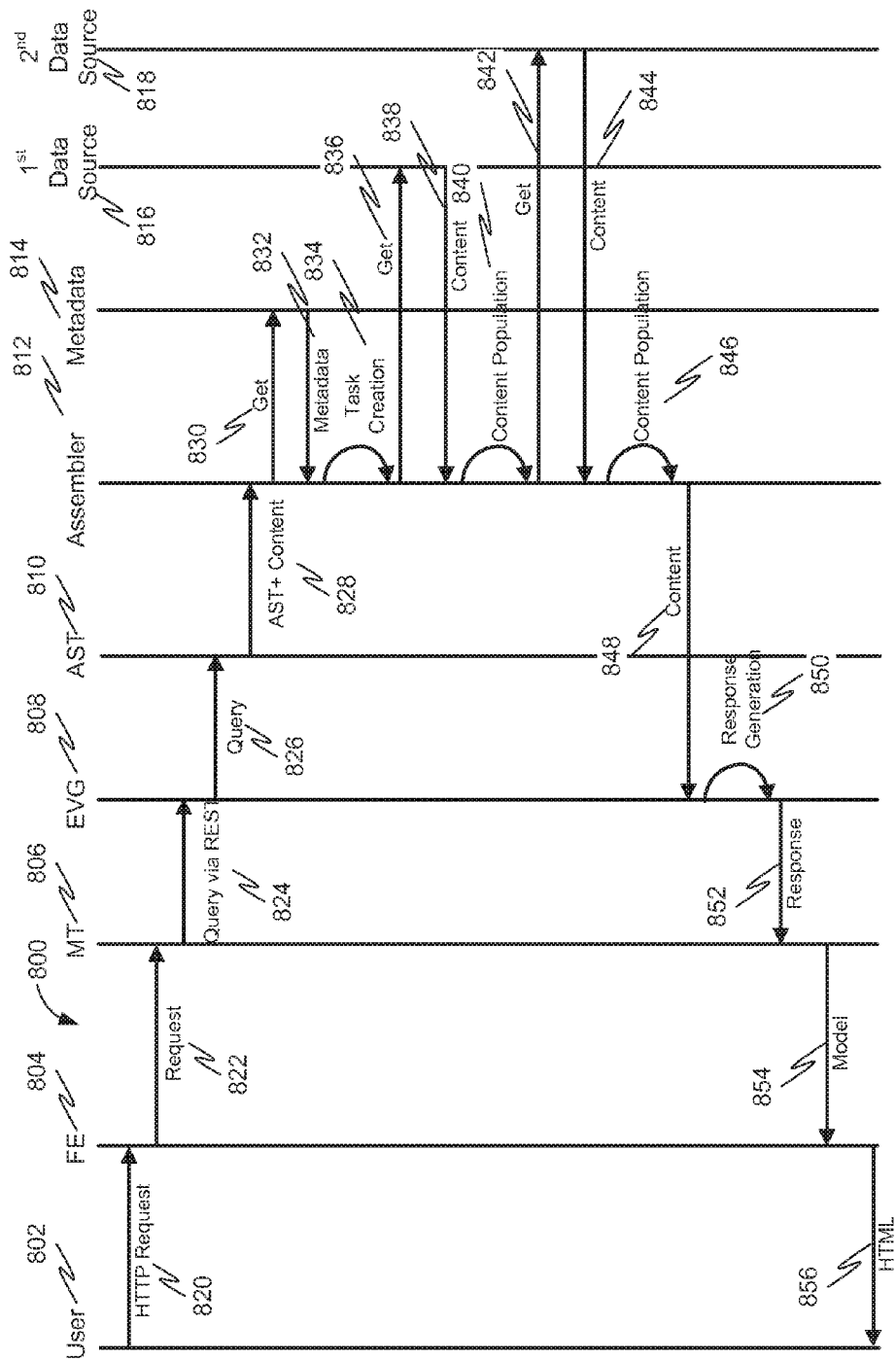
FIG. 8 is a sequence diagram illustrating a method 800 in accordance with an example embodiment.

FIG. 8 is a sequence diagram illustrating a method 800 in accordance with an example embodiment. The method 800 involves a number of different entities, including a user 802, front-end 804, middle tier 806, EVG engine 808, AST query engine 810, Assembler 812, Metadata source 814, 1st data source 816, and 2nd data source 818. At operation 820, the user (through, for example, a browser) may send an HTTP request to the front-end 804. At operation 822, the front-end 804 sends a request to the middle tier 806. At operation 824, the middle tier 806 sends a query via REST to the EVG engine 808. At operation 826, the EVG engine 808 sends a query to the AST query engine 810.

At operation 828, the AST query engine 810 sends an AST message for content to the assembler 812. At operation 830, the assembler 812 sends a get request to the metadata source 814, which returns the metadata at operation 832. At operation 834, the assembler 812 then creates the tasks. At operation 836, the assembler 812 sends a get request to the 1st data source 816, which returns content at operation 838. At operation 840, the assembler 812 populates the content in a data structure. At operation 842, the assembler 812 sends a get request to the 2nd data source 818, which returns content at operation 844. At operation 846 the assembler 812 populates the content in a data structure.

At operation 848, the assembler 812 sends the content to the EVG engine 808, which at operation 850 forms a response from the content. This response is sent to the middle tier 806 at operation 852. The middle tier 806 then returns a model to the front-end 804 at operation 854. The front-end then returns an HTML page at 856 based on the model.

Figure 9:
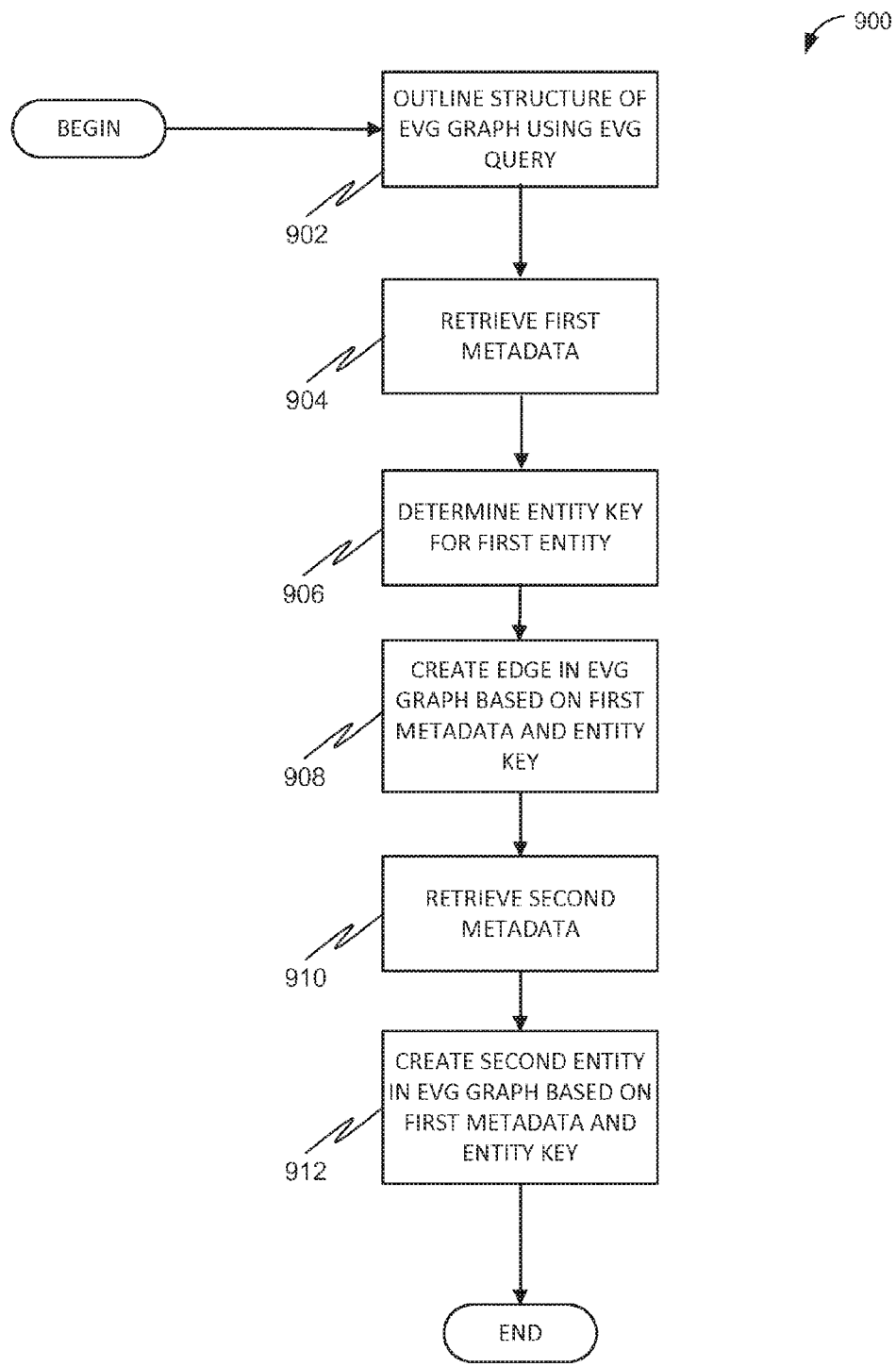
FIG. 9 is a flow diagram illustrating a method in accordance with an example embodiment.

FIG. 9 is a flow diagram illustrating a method 900 in accordance with an example embodiment. At operation 902, structure of a resultant Every Document as a Graph (EVG) graph may be outlined using an EVG query. At operation 904, first metadata for a first data source may be retrieved. At operation 906, at least one entity key for a first entity is determined, wherein the entity key comes directly from the EVG query or from an entity on a preceding level of the EVG graph. Then, at operation 908, based on the first metadata and entity key, an edge may be created in the EVG graph beginning at the first entity, wherein the edge contains information retrieved from the first data source. At operation 910, second metadata for a second data source is retrieved, the second data source being of a different data source type than the first data source such that accessing data from the first data source is performed differently than accessing data from the second data source. Then, based on the second metadata and information contained in the edge retrieved from first data source, a second entity may be created in the EVG graph, wherein the edge connects to the second entity, wherein the second entity contains information retrieved from the second data source.

Figure 10:
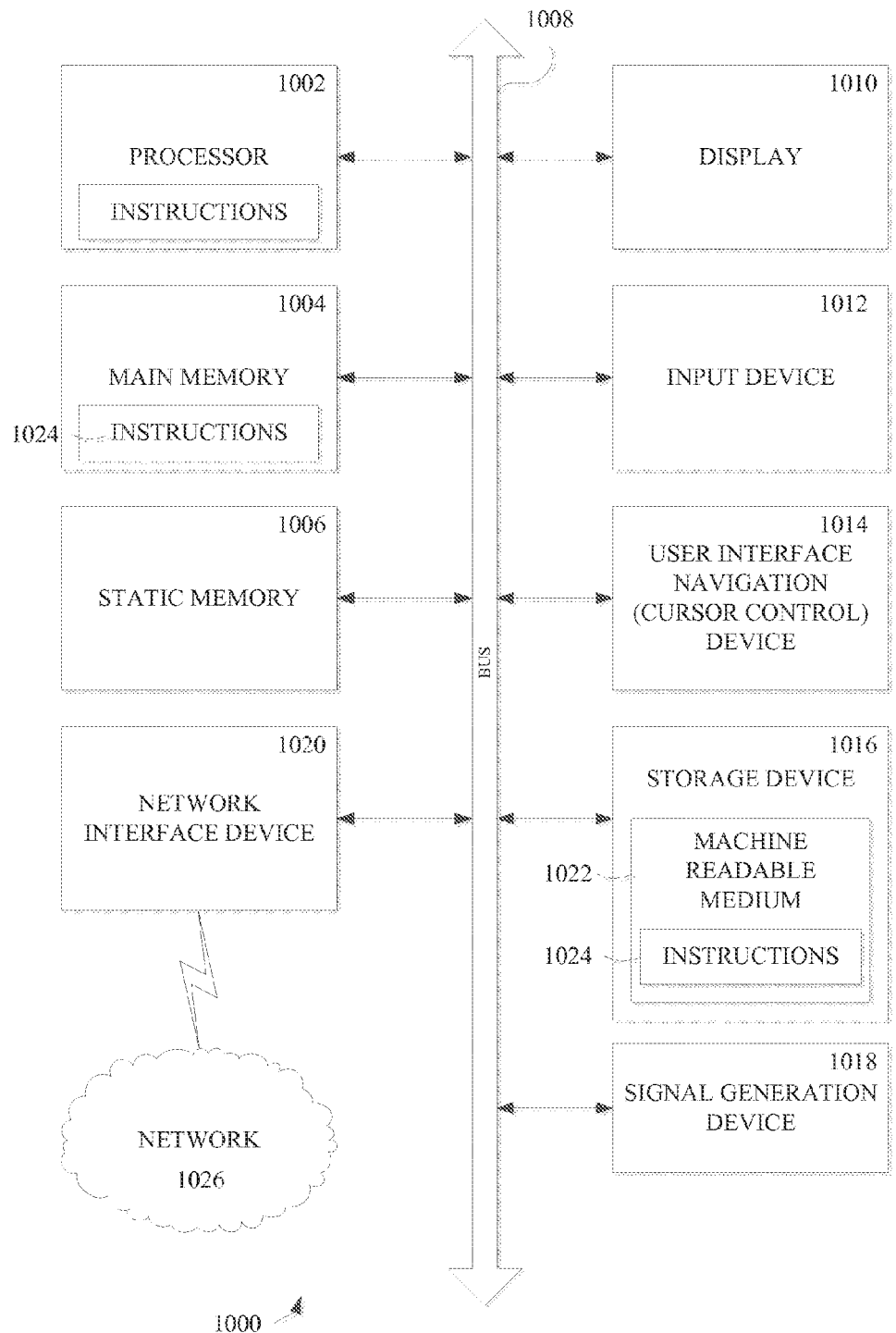
FIG. 10 is a diagrammatic representation of a machine in the example form of a computer system within which a set of instructions, for causing the machine to perform any one or more of the methodologies discussed herein, may be executed.

FIG. 10 is a diagrammatic representation of a machine in the example form of a computer system 1000 within which a set of instructions 1024, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a cursor control device), a storage device 1016, a signal generation device 1018 (e.g., a speaker and a network interface device 1020.

The storage device 1016 includes a machine-readable medium 1022 on which is stored one or more sets of instructions and data structures (e.g., instructions 1024) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

The instructions 1024 may further be transmitted or received over a network 1026 via the network interface device 1020 utilizing any one of a number of well-known transfer protocols (e.g., Hyper Text Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions e.g., 1024. The term "machine-readable medium" shall also be taken to include any medium that is capable of storing and encoding a set of instructions e.g., 1024 for execution by the machine and that cause the machine to perform any one or more of the methodologies of embodiments of the present disclosure, or that is capable of storing and encoding data structures utilized by or associated with such a set of instructions e.g., 1024. The term "machine-readable medium" shall accordingly be taken to include, but not be limited to, solid-state memories, optical and magnetic media. Such media may, without limitation, also include hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "disclosure" merely for convenience and without intending to voluntarily limit the scope of this application to any single embodiment if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium 1022 or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules.) In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine, but deployed across a number of machines. In some example embodiments, the processor or processors 1002 may be located in a single location (e.g., within a home environment, an office environment or as a server farm), while in other embodiments the processors 1002 may be distributed across a number of locations.

The one or more processors 1002 may also operate to support performance of the relevant operations in a "cloud computing" environment or as a "software as a service" (SaaS). For example, at least some of the operations may be performed by a group of computers (as examples of machines including processors 1002), these operations being accessible via a network (e.g., the Internet) and via one or more appropriate interfaces (e.g., application program interfaces (APIs).)

Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:
1. A computer-implemented method comprising:
retrieving first metadata for a first data source;
determining at least one entity key for a first entity, wherein the entity key comes directly from a query or from an entity on a preceding level of a graph;
based on the first metadata and entity key, creating an edge in the graph beginning at the first entity, wherein the edge contains information retrieved from the first data source;
retrieving second metadata for a second data source, the second data source being of a different data source type than the first data source such that accessing data from the first data source is performed differently than accessing data from the second data source; and
based on the second metadata and information contained in the edge retrieved from first data source, creating a second entity in the graph, wherein the edge connects to the second entity, wherein the second entity contains information retrieved from the second data source.

2. The method of claim 1, further comprising recursively repeating the method for each level of the graph.

3. The method of claim 1, wherein the first entity and second entity are strongly-typed Java objects.

4. The method of claim 1, further comprising:
receiving a query from a user;
parsing the query into a first data structure;
using the first data structure to traverse the graph by generating a task request for each edge off of the first entity, wherein the traversing includes following each of the edges of the first entity in parallel and, if encountering an entity having an additional edge, generating a task request for the additional edge and repeating the using the first data structure to traverse the graph for the additional edge.

5. The method of claim 4, wherein the first data structure is an Abstract Syntax Tree (AST).

6. The method of claim 1, wherein the graph is stored as a multi-tenant architecture.

7. The method of claim 1, wherein the first and second entity each contain a uniform resource name (URN), the URN including a scheme, an entity type, a partition key, and an entity key.

8. The method of claim 1, further comprising:
retrieving third metadata for a third data source, the third data source being of a different data source type than the first data source and second data source such that accessing data from the third data source is performed differently than accessing data from the first or second data source.

9. A computer-implemented system comprising:
an assembly component, executable by a processor and configured to:
retrieve first metadata for a first data source;
determine at least one entity key for a first entity, wherein the entity key comes directly from a query or from an entity on a preceding level of a graph;
based on the first metadata and entity key, create an edge in the graph beginning at the first entity, wherein the edge contains information retrieved from the first data source;
retrieve second metadata for a second data source, the second data source being of a different data source type than the first data source such that accessing data from the first data source is performed differently than accessing data from the second data source; and
based on the second metadata and information contained in the edge retrieved from first data source, create a second entity in the graph, wherein the edge connects to the second entity, wherein the second entity contains information retrieved from the second data source.

10. The system of claim 9, further comprising a client application storing a client library having validation and stencilization functions.

11. The system of claim 9, further comprising a search service configured to receive a query from a user, parse the query into a first data structure, and use the first data structure to traverse the graph by generating a task request for each edge of the first entity, wherein the traversing includes following each of the edges of the first entity in parallel and, if encountering an entity having an additional edge, generating a task request for the additional edge and repeating the using the first data structure to traverse the graph for the additional edge.

12. The system of claim 11, wherein the first data structure is an Abstract Syntax Tree (AST).

13. The system of claim 9, wherein the first and second entity each contain a uniform resource name (URN), the URN including a scheme, an entity type, a partition key, and an entity key.

14. A non-transitory machine-readable storage medium having instruction data to cause a machine to perform the following operations:
retrieving first metadata for a first data source;
determining at least one entity key for a first entity, wherein the entity key comes directly from a query or from an entity on a preceding level of a graph;
based on the first metadata and entity key, creating an edge in the graph beginning at the first entity, wherein the edge contains information retrieved from the first data source;
retrieving second metadata for a second data source, the second data source being of a different data source type than the first data source such that accessing data from the first data source is performed differently than accessing data from the second data source; and
based on the second metadata and information contained in the edge retrieved from first data source, creating a second entity in the graph, wherein the edge connects to the second entity, wherein the second entity contains information retrieved from the second data source.

15. The non-transitory machine-readable storage medium of claim 14, wherein the edge beginning at the first entity represents a relationship between the first entity and the second entity.

16. The non-transitory machine-readable storage medium of claim 14. wherein the first entity, second entity, first edge, and second edge are all strongly-typed Java objects.

17. The non-transitory machine-readable storage medium of claim 14, further comprising:
receiving a query from a user;
parsing the query into a first data structure;
using the first data structure to traverse the graph by generating a task request for each edge of the first entity, wherein the traversing includes following each of the edges of the first entity in parallel and, if encountering an entity having an additional edge, generating a task request for the additional edge and repeating the using the first data structure to traverse the graph for the additional edge.

18. The non-transitory machine-readable storage medium of claim 17, wherein the first data structure is an Abstract Syntax Tree (AST).

19. The non-transitory machine-readable storage medium of claim 14, wherein the graph is stored as a multi-tenant architecture.

20. The non-transitory machine-readable storage medium of claim 14, wherein the first and second entity each contain a uniform resource name (URN), the URN including a scheme, an entity type, a partition key, and an entity key.

* * * * *